United States Patent [19]
Parker et al.

[11] Patent Number: 4,788,651
[45] Date of Patent: Nov. 29, 1988

[54] METHOD FOR IMPROVING TREAD NOISE BY RELATIVE ROTATION OF A RIB AND SIMULATING THE EFFECT THEREOF

[75] Inventors: David H. Parker, Brecksville; David G. Caruso, Cuyahoga Falls; Robert J. Blinn, North Canton; Donald B. Thrasher, Brecksville, all of Ohio

[73] Assignee: The Uniroyal Goodrich Tire Company, Akron, Ohio

[21] Appl. No.: 158,978

[22] Filed: Feb. 22, 1988

Related U.S. Application Data

[63] Continuation-in-part of Ser. No. 19,910, Feb. 27, 1987, Pat. No. 4,727,501.

[51] Int. Cl.$^4$ .............................................. B60C 11/10
[52] U.S. Cl. .................................... 364/574; 364/576; 152/209 R
[58] Field of Search ........................ 152/209 R, 209 D; 364/574, 576

[56] References Cited

U.S. PATENT DOCUMENTS

| | | | |
|---|---|---|---|
| 3,926,238 | 12/1975 | Vorih | 152/209 R |
| 4,327,792 | 5/1982 | Landers | 152/209 R |
| 4,442,499 | 4/1984 | Sekula et al. | 364/574 |
| 4,598,748 | 7/1986 | Campos et al. | 152/209 R |
| 4,727,501 | 2/1988 | Parker et al. | 364/574 |

OTHER PUBLICATIONS

Vorterasian, "Quieting Noise Mathematically—Its Application to Snow Tires," *Society of Automotive Engineers* Paper No. 690520, May 19, 1969.

*Primary Examiner*—Tom Wyse
*Attorney, Agent, or Firm*—Alfred D. Lobo; Alan A. Csontos

[57] ABSTRACT

A method is disclosed for evaluating the level of objectionable noise associated with the operation of a tire by virtue of its tread contacting a road surface, which comprises digitizing the tread design on a coordinate system so as to define load-supporting portions of the tread in contact with the pavement, and distinguish them in binary form from those portions of the tread which are not in contact, as multiple matrix elements; defining a generally arcuate profile of a leading or trailing edge of a footprint of the tread by fitting an equation to the edge; sequentially performing the time ensemble summation, of the noise produced by each matrix element, over every matrix element on the entire circumferential surface; converting the sequence of summation to a periodic analog signal; converting the analog signal to a sound; and, aurally evaluating the sound. In a simplified case 0's and 1's along at least one footprint edge are sequentially summed around the circumference of the tire. The system requires only a means for digitizing the tread pattern, a computer to perform the necessary manipulations of data, and a means to convert a digital signal to an analog signal. Having subjectively chosen a tread pattern deemed to have an acceptable noise level, ribs are then relatively rotated one with respect to another to obtain an improved level of tread noise.

5 Claims, 11 Drawing Sheets

METHOD FOR IMPROVING TREAD NOISE BY RELATIVE ROTATION OF A RIB AND SIMULATING THE EFFECT THEREOF

This is a continuation-in-part application of Ser. No. 019,910 filed Feb. 27, 1987, to be issued as U.S. Pat. No. 4,727,501 on Feb. 23, 1988.

BACKGROUND OF THE INVENTION

This invention relates to improving the level of noise generated by a tire's tread as it travels upon a road surface, after the tread has been evaluated by the invention claimed in the parent application, and the tread has been deemed to generate an acceptable level of objectionable noise.

More specifically, this invention relates to simulating the effect on the level of noise associated with a patterned tread on a tire when it is operated on a road surface at any desired rotational speed, after making adjustments in the relative position of one rib with respect to another in the tread pattern. Thus, it will be appreciated that, though the method of this invention is applicable to any tread pattern having plural ribs, irrespective of the level of noise the tread generates when used on a wheel on an operating vehicle, it is most aptly directed to one which has been deemed acceptably quiet, but which promises to be even more so if the proper relative circumferential displacement of each rib relative to another can be derived by an appropriate simulation, that is, without physically producing a single tread. By circumferential displacement of one rib relative to another on the tread's surface, without changing the parallel relationship of the ribs in spaced-apart planes which are orthogonal to the longitudinal axis of the tire. Such circumferential displacement results in a rotational displacement of one rib relative to another.

A tire manufacturer seeks to design a tire tread which not only fulfills its function relating to wear, wet and dry traction, rolling resistance, and other desirable properties, but also runs with an acceptably low noise level. Preferably the tire should run at an acceptable noise level through the entire operating range of a particular vehicle on which the tire is to be mounted.

Since noise is inherently subjective, due to the psychoacoustical effects involved, there is no known mathematical criteria to define noise. It is therefore necessary to subjectively evaluate a tire for noise acceptability. Historically, this has been done by hand cutting a set of tires or building a mold to produce a set of tires for evaluation. This process is expensive and time consuming, thus limiting the number of trials available to the design engineer to optimize the design.

Much energy has been devoted to designing a tire tread which will spread the noise spectrum generated by the running tire. For example, U.S. Pat. Nos. 4,327,792 and 4,474,223 teach how to spread the noise over a wide range of frequency to reduce the tonality and undesirability of the sound. John H. Varterasian described a Mechanical Frequency Modulation method in SAE 690520, *Quieting Noise Mathematically—Its Application to Snow Tires,* 1969. The problem is that, no matter what criteria are used to design the tread, there is no assurance that the result will be a tread with an acceptable noise level. Whether the noise is spread over a wide range of frequency, or dominated by one or a few frequencies, is of secondary importance if the noise level is unacceptable.

There is presently in use a tire-noise simulator at Technischer Überwachungs-Verein Bayern in Munich, West Germany, in which a scaled tread pattern is drawn on a band of paper, with the load supporting portions (lugs) shaded in black, and the grooves in white. The band is mounted on a rotatable drum having a fixed circumference. A light is shone on the pattern and reflected light is received by up to 40 photodetectors arranged side-by-side to extend across the width of the tread pattern. As is evident, this is a simple analog device to produce a pulse width modulated signal which may be correlated to the actual sound produced by the tread pattern. The pulse width is equal to the dwell time of the block as it traverses each detector or channel.

Among the limitations of such a device is that the model (pulse width signal) for the sound produced is fixed by the hardware and cannot easily be modified or fine-tuned. Also, the model is insensitive to speed changes since a change of speed simply dilates or contracts the period of the waveform. Further, a new drawing must physically be made for each modification of block and channel configurations in modified tread designs. Still further, the size and sensitivity limitations of the photodetectors are exacerbated by the necessity of having to change their physical location to lie along the profile (edge) of a footprint, assuming such a refinement was desired over simply aligning the photodetectors across the width of the pattern.

It occurred to us that the foregoing limitations could be obviated if a noise evaluation could be predicated upon that generated by a design unit of a tread. Design unit refers to an arbitrarily chosen characteristic portion of the tread which is representative in general form, but with scale variations which cumulatively compose the tread. A preferred design unit is typically bounded by the circumferential centerline of the tread, a furthermost circumferential edge in contact with the road (contact edge), and predetermined lateral spaced apart boundaries.

No prior art has considered the use of a design unit as the only critical element necessary for making the aural evaluation with the help of appropriate software.

The device of our system, being purely digital, not only avoids the limitations of the prior art analog device but lends itself to being fine-tuned for a host of refinements to mimic the actual operation of the tread on a tire at varying speeds, loads, and inflation pressures on particular road surfaces. Under actual operation, each point on the tread's surface may not be independent of neighboring points. In other words, when a point is in contact with the road surface, there may be some, though slight, interaction with the points which are immediately precedent, also with the points on either side, and the points immediately subsequent. Further, the loading on a point near the center of the tread may not be the same as that on a point near an edge, nor would the contribution of each be the same based on their relative positions. It is such refinements which may be *weighted* into the construction of a sound waveform using our method. It lends itself to being tailored to provide the level of sophistication demanded of it.

The optimum test for evaluating the acceptability of the noise level of a tire is to mount a set of identical tires on a specific vehicle, and run it over a designated surface at various speeds, loads, and inflation pressures in the vehicle's operating range while a person within the vehicle listens to the sound generated by the tires. Of course, to do so, one must design the tread, construct green tires, build a mold to cure the green tires, and test the cured tires on the vehicle. This invention obviates the foregoing steps, yet arrives at a reliable evaluation. This allows the design engineer to screen a virtually unlimited number of variations of a basic design by editing tread designs, much like a word processor edits test. Since the noise generating mechanism is very complex, and not well understood, it is not expected that this invention will totally eliminate the need for actual testing.

Recognizing that it is self-evident positioning of ribs relative to each other will influence the level noise, in the past, either an upper or lower portion of a tread ring has been arbitrarily displaced relative to the other portion in a tire mold. The resulting cured tire was then tested with the expectation that an improvement would result. Aside from the obvious hit or miss approach of this technique, it suffers the limitation that an entire one half of a tread pattern must be rotated relative to the other half. Our methodology provides a logical approach to reducing the tread noise.

SUMMARY OF THE INVENTION

It has been discovered that the actual running of a tire's tread on a road surface may be modeled on a computer. Since factual criteria for evaluation of the sound generated by a running tire are stored as information in the computer's storage, this information can be manipulated, at will, to make changes with the purpose of optimizing the tread design being modeled.

It is therefore a general object of this invention to model the actual test-running of a tire on a computer, and manipulate variables so as to optimize the design of the thread for the most acceptable noise level.

It is also a general object of this invention to eliminate the arbitrary choice of a usable tread, the cost of building molds, constructing and curing tires, and the time and effort involved in actually testing them; yet, to evaluate a multiplicity of tread designs for those with an acceptable noise level.

It is a specific object of this invention to exploit simplifications afforded by symmetry, non-interaction between domains, and shift-invariance. These conditions are used to optimize the locations of tread elements for minimizing noise.

It is a more specific object of this invention to provide a highly economic method for evaluating a tread design for the noise level it generates, comprising, digitizing the tread's design on an appropriate coordinate system, digitizing each of plural selectedly pitched design units over the 360° circumference of the tread, so as to distinguish areas of contact between load supporting tread elements (or lugs) and spaces (or grooves) therebetween and define each in binary form, defining, with an algorithm, an arcuate profile of a leading and/or trialing edge of a footprint generated by said tread, summing the noise producing functions along said profile repetitively over the tread circumference to provide a multiplicity of summation, converting each summation to an analog signal correlatable in magnitude with said summation, converting each analog signal to a sound for evaluation of the noise level, and, aurally evaluating the sound to obtain an acceptable noise level.

The specific improvement addressed herein is the simulation and evaluation of the effect of circumferentially displacing one rib with a preselected pitch sequence relative to an adjacent, or distally spaced apart other rib.

BRIEF DESCRIPTION OF THE DRAWINGS

The foregoing and other objects and advantages of our invention will appear more fully from the following description, made in connection with the accompanying drawings of preferred embodiments of the invention, wherein like reference characters refer to the same or similar parts throughout the view and in which.

DETAILED DESCRIPTION OF PREFERRED EMBODIMENTS

Consider a tire tread geometry represented as a m×n matrix of points (typically 2048×200) with m rows around the circumference and n columns across the width of the tread. This matrix, which is generated from a shaded drawing by an optical scanner; an actual tire by a line scan camera; or other means; will be called the binary tread matrix, with elements b(i,j), where $$b(i,j) = \begin{cases} 1 & \text{tread element} \\ 0 & \text{space.} \end{cases} \quad (1)$$

Figure 1:
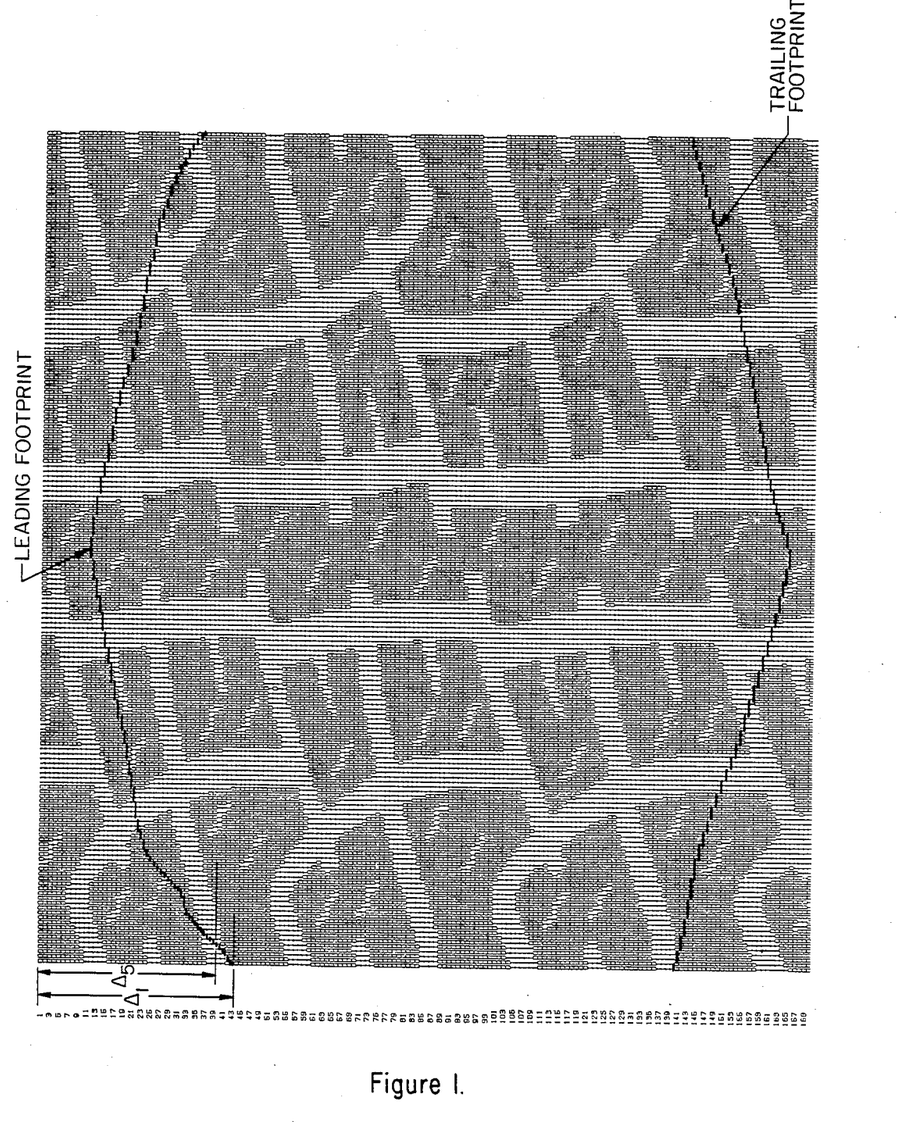
FIG. 1 is a scale representation of a tread pattern in binary form, showing a typical footprint.

An example of a binary tread matrix is shown in FIG. 1 wherein the leading and trailing edges of the footprint are provided by an approximation of an actual footprint of a similar design. Note that the b(i,j)'s have been complemented (1's and 0's reversed) to bear a closer visual resemblance to the actual tire.

It is assumed that the sound produced by the tread pattern is made up of a linear combination of the sounds produced by each matrix element. Let the sound produced by each element of the binary tread matrix be represented by a generalized periodic function $$g(i,j;t \pm T) = g(i,j;t) \quad 1 \leq i \leq m \quad (2)$$
$$1 \leq j \leq n \quad (3)$$

where T is the period of the tire computed to correspond to a preselected linear velocity of the vehicle. We will assume that the g(i,j; t)'s are generated from the binary tread matrix by an operation which is denoted symbolically as $$g(i,j; t) = S\{b(i,j)\} \quad (4)$$

where S depends on the sound gneration model being used. S may be a simple point operation, a group operation (such as convolution operations commonly used in image processing), or derived from experimental data. At this point, it is not necessary to know S, the m×n g(i,j; t)'s, or how they are obtained, since the intent is to construct a mathematical formalism for dealing with a linear combination of sound generators. The specifics of one model used to generate the g(i,j; t)'s will be discussed later.

It is assumed that the sound produced by each element of the tread matrix, g(i,j; t), is initiated or turned on by contact or departure with the road surface, i.e., the leading and trailing edges of the footprint outline. It is therefore necessary to sequence the turning on of the g(i,j; t)'s coincident with their entry or exit from the footprint. For simplicity, this discussion will be limited to the sound produced by the front of the footprint only—although unless specifically stated otherwise, it is understood that the sound produced by the rear of the footprint is similarly produced.

It is advantageous to construct the mathematical formalism in such a fashion as to separate the effect due to the sound generated by each element; and the effect due to the sequence, or pattern, of the elements. It will be assumed that the g(i,j; t)'s turn on at g(i,j; 0). This requires a modification of g(i,j; t) to g(i,j; t−τ$_{ij}$), where τ$_{ij}$ is the time at which element i,j contacts the road or turns on. This allows one to generate a set of g(i,j; t) functions independent of where it is located in relation to the footprint (and thus when it will enter the footprint) and correct for where it is located by shifting the function in time by τ$_{ij}$.

It is generally known, from the Fourier transform shifting theorem, that shifting a function in the time domain produces no change in the magnitude of the Fourier transform, but does produce a change in the phase of the Fourier transform. It is also generally known that the Fourier transform of a periodic function with period T produces a Fourier transform with discrete frequency components at haromonics of the fundamental frequency, i.e., 1/T, 2/T, 3/T, etc.

Each of the generalized functions g(i,j; t−τ$_{ij}$) may now be visualized in the frequency domain as having components at the same harmonic frequencies, the magnitudes of which depend on the construction of the tire, road surface, materials, etc.; and the phases of which depend on the location of thread elements and footprint shape, i.e., the τ$_{ij}$'s. This treats the problems of the sound generated by an element, and when the sound is produced independently. This is a fundamental feature of the invention which makes it useful for optimizing the location of tread elements.

The sound produced by the edge of the footprint can now be expressed as the time ensemble summation over every matrix element, or $$p(t) = \sum_{i=1}^{m} \sum_{j=1}^{n} g(i,j;t - \tau_{ij}). \quad (5)$$

Figure 2:
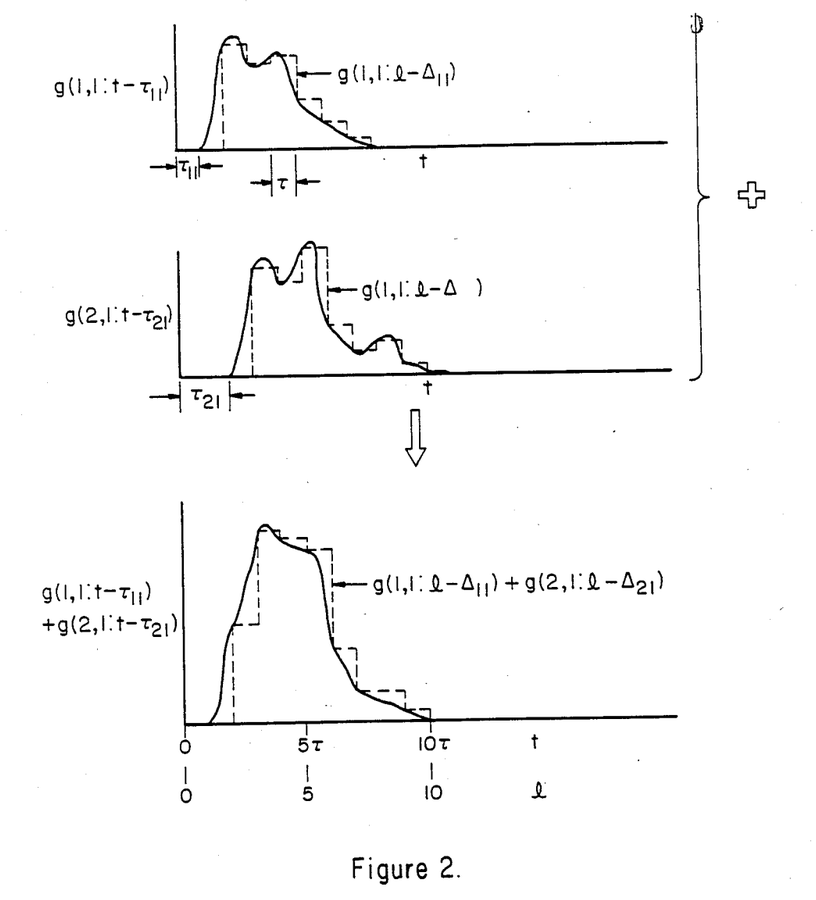
FIG. 2 is a graphical representation schematically illustrating a time ensemble summation. Equation (5) is shown as solid lines, and equation (9) is shown as dashed lines.

Referring to FIG. 2 there is shown individual representations corresponding to individual functions making their contributions as a function of time shown as the abscissa. Two elements g(1,1; t−τ$_{11}$) and g(2,1; t−τ$_{21}$) of the m×n elements are schematically represented, the solid line indicating the continuous function and the dashed line indicating the sampled function. The summation of the two elements is shown to produce the summed function g(1,1; t−τ$_{11}$)+(2,1; t−τ$_{21}$). As shown, 1 corresponds to units of τ and at the sampling rate chosen, there is a one-to-one correspondence. It will be evident that one can change the sampling rate which will change the correspondence.

An analogy will better illustrate the meaning of equation (5). Suppose you had a group of people arranged in a formation of rows and columns. The row an column of each person could be identified as i and j respectively. Each person is assigned a unique sound, g(i,j; t). Each person will make his sound, proceeding in sequential order down each column at regular intervals. The last person in each column is followed by the first person in the same column; thus producing a periodic sound. A flashing light is used to set the interval. Each column, j, initially starts with a row i which can be different for each and every column. We call the starting row in the j$^{th}$ column Δ$_j$. The Δ$_j$'s define an arcuate profile across the columns, which translates down the columns in step with the light flashes. For example, the first group used to describe the arcuate profile of a leading edge would be; (Δ$_1$, 1), (Δ$_2$, 2), (Δ$_3$, 3), . . . . The next group used to describe the arcuate profile of a leading edge which is set off by the next flash of the light would be; (Δ$_1$+1, 1), (Δ$_2$+1, 2), (Δ$_3$+1, 3) . . . . In FIG. 1 Δ$_1$ and Δ$_5$ are laterally spaced apart by 5 columns from a reference line.

It is easy to see how the sound produced will vary. The sound assigned to each person j(i,j; t) will change the character of the sound. The starting rows will change the phasing of the sound, much like the footprint shape and tread element design sequence. The rate of the blinking light will also change the waveform. For example, if the light is blinking slowly, the sounds produced by two adjacent people may not overlap, but at a faster rate the sounds will overlap and instead of producing two distinct sounds spaced apart, a combination of the two sounds is produced.

If the blinking light is now modified to include a digital counter that counts from 1 to m cyclicly, it is easy to see that the people no longer need to line up in rows and columns. They are now instructed to simply watch the counter and make their sound when the count equals their assigned value of $i-\Delta_j$ where i was their row number, and $\Delta_j$ was the starting row of their column. To modify the pattern, each person is simply assigned a new counter number or $i-\Delta_j$. There is no need to physically modify columns and rows of people. The next refinement would be to record each of the g(i,j; t)'s and build a programmable device to sequence the initiation of the g(i,j; t)'s. The ulitmate refinement would be realized if the g(i,j; t)'s could be modeled and thus synthesized.

In order to perform the time ensemble summation digitally, the continuous waveform p(t) is approximated by a sampled waveform p(l), where $$l = \text{integer}\left\{\frac{t}{\tau}\right\} \quad (6)$$

and $\tau$ is the time interval between samples. For convenience, this discussion will assume $$\tau = \frac{T}{m}, \quad (7)$$

i.e., p(t) will be sampled m times per rotation of the tire, or once for every increment, i, of the tire rotation.

It is generally known that the Nyquist rate, as defined in; *Principles of Communication Systems,* Taub and Schilling, McGraw-Hill, 1971; (the disclosure of which is incorporated by reference thereto as if fully set forth herein), is twice the highest frequency component, or $$\frac{m}{T} > 2f_{max}. \quad (8)$$

The sampled waveform, as shown using dashed lines in FIG. 2, is generated from the sampled generating functions, i.e., $$p(l) = \sum_{i=1}^{m} \sum_{j=1}^{n} g(i,j;l - \Delta_{ij}) \quad 1 \leq l \leq m \quad (9)$$

where $$g(i,j;l - \Delta_{ij}) = g\left(i,j;\text{integer}\left\{\frac{t - \tau_{ij}}{\tau}\right\}\right), \quad (10)$$

and $$\Delta_{ij} = \frac{\tau_{ij}}{\tau}. \quad (11)$$

Equation (9) may be visualized by thinking of the tire's rotation as being divided into m equal angular increments. p(l) is the sound produced as the tire rotates through the $l^{th}$ increment from the starting point so that there are m regularly spaced sequential translations of the footprint around the circumference of the tire.

If we assume that the footprint edge is invariant with the tire rotation at a given speed, then the $\Delta_{ij}$'s for each column are simplified by noting that b(1,j) will be followed by b(2,j) for the next increment of 1, or more generally $$\Delta_{ij} = i - \Delta_j \quad (12)$$

where $\Delta_j$ is the number of rows that column j is offset due to the curvature of the footprint edge. It is therefore only necessary to determine the $\Delta_j$'s for each of the n columns. Note that there will be one element in each of the n columns with a given value for $\Delta_{ij}$. These n elements will all enter the footprint at the same time.

Substituting equation (12) into equation (9), $$p(l) = \sum_{i=1}^{m} \sum_{j=1}^{n} g(i,j;l - [i - \Delta_j]). \quad (13)$$

In a typical procedure, an analysis is made of a tread assuming there is negligible deformation of the load-supporting tread elements in contact with the road surface, and the footprint of the tread design is approximated by comparison with a footprint of an actual tire constructed in a similar manner, and the tread of which tire is as close to the test thread as is available.

While the tire is mounted on a stationary vehicle, and is therefore under static load, a footprint is obtained on a sheet of white paper, with a sheet of carbon paper on top, placed under the tire mounted on the vehicle, to give a clear imprint upon contact with the paper. It will be recognized that the footprint under a dynamic load, will be different, further varying as the speed of the vehicle, inflation pressure, and the load it carries, are varied.

Only enough of the pattern of the tread (to be tested) is required, as will provide an approximation of what would be the actual footprint of the tread, should a tire with that tread design actually be built. With this estimate of the footprint, an equation is written to fit the arcuate profile of either a leading or trailing edge of the footprint.

By actual measurements from the footprints under varying static loads, and inflation pressures, we measure different $\Delta_j$'s, and input these to obtain an approximation of noise under operating loads. This provides a subjective evaluation of the noise in the normal operating range from essentially no load to fully loaded. This in turn provides information as to the sensitivity of the tread pattern design to changes in footprint. The ideal is to design a tread with minimal sensitivity within the range.

Figure 3:
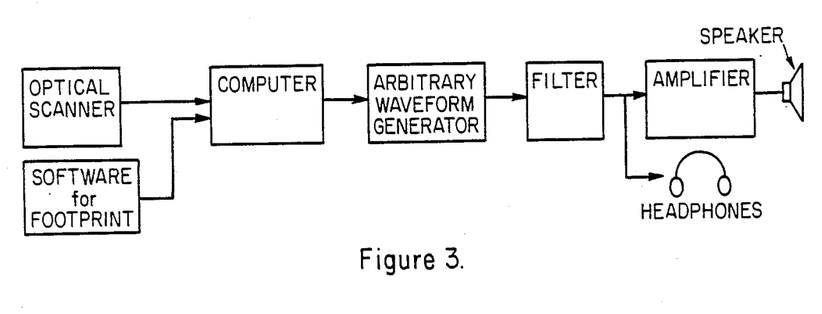
FIG. 3 is a block diagram schematically illustrating the components of the system.

Equation (13) generates m samples of the sound waveform. The sampled waveform may then be filtered in the Fourier domain to simulate the car sound transmission function, or to select or reject a frequency band of interest. The m samples are then loaded into an arbitrary waveform generator such as a Qua Tech WSB-10 or Waveteck model 75 which converts the digital sampled waveform into a periodic analog signal with the same period, T. The signal is then amplified, and played over loudspeakers or headphones for subjective evaluation as illustrated in FIG. 3.

A fluid displacement model has been tested which considers the tread to be displacing a fluid at the road surface. This model produces a sound pressure proportional to the rate at which the volume of air is being displaced by the tread matrix. In this model, each element of the binary tread matrix acts like a small piston pushing out a volume of air at a constant rate for a time T/m, coincident with entry into the footprint. In this case, each $g(i,j; 1-\Delta_{ij})$ function produces a nonzero component for only one value of l, i.e., there is no ringing or transient sound produced after the matrix element enters the footprint interior. In this case, S can be defined as an operation which generates the values for the $g(i,j; 1-\Delta_{ij})$'s by $$g(i,j;l - \Delta_{ij}) = \begin{cases} b(i,j) & l = \Delta_{ij} \\ 0 & l \neq \Delta_{ij} \end{cases} \quad (14)$$

Recall that $$\Delta_{ij} = i - \Delta_j.$$

Therefore, the only nonzero $g(i,j; 1-\Delta_{ij})$'s will be when $$l = i - \Delta_j \quad (15)$$

or $$i = l + \Delta_j. \quad (16)$$

In this case, $$\sum_{i=1}^{m} g(i,j;l - \Delta_{ij}) = b(l + \Delta_j, j). \quad (17)$$

Substituting Equation (17) into Equation (9), $$p(l) = \sum_{j=1}^{n} b(l + \Delta_j, j). \quad 1 \leq l \leq m \quad (18)$$

Equation (18) represents the sound produced by the front edge of the footprint only. The contribution due to the rear edge would be a vacuum effect, producing a 180° phase shift in the waveform with a time delay of $\Delta f'$. The combined results would be $$p(l) = \sum_{j=1}^{n} b(l + \Delta f, j) - b(l + \Delta f', j). \quad (19)$$

It should be noted that in general $$\Delta f' \neq \Delta f + \text{constant}. \quad (20)$$

This means that the sound components produced by the front and rear edges may be different.

While this model is a first order approximation, it does preserve the salient characteristic of the phase relationship of the Fourier components; which are known to be responsible for much of the intelligibility of audio signals.

Three commercially available BF Goodrich passenger tires; (a) P597 XLM P205/75R14, (b) P845 RADIAL T/A P235/60R15, and (c) P784E XLM H/T P195/75R14: were rated for subjective noise ratings. The test was conducted by a trained jury, using a especially maintained 1984 Chevrolet Caprice on a smooth asphalt highway. They were ranked from best to worst as follows: (a), (b), and (c) there being a minimum significant difference between (a) and (b), and a slightly greater difference (about 15%) between (b) and (c). By minimum significant difference we refer to a rating unit which a person can repetitively and reliably distinguish from one test to the next.

The same tires were also evaluated by our method using the fluid displacement model for a single footprint edge, as described by Equation (18) by several judges, each making a separate and individual evaluation. The equipment used was: an IBM PC/AT with a Qua Tech WSB-10 arbitrary waveform generator board, an analog filter to simulate the loss of sound transmission due to the body of the car (tranmission insertion loss), an audio amplifier, and speakers. They were ranked by our simulated test from best to worst in precisely the same order as in the actual road test. Thus, the evaluations made by actual testing were confirmed, and the small differences ditinguishing one tire from the next were corroborated.

Recall from Equation (13) in the parent patent application that the sound pressure, p(l), is calculated as a summation over all $g(i,j)$'s corrected for footprint shape. That is, $$p(l) = \sum_{i=1}^{m} \sum_{j=1}^{n} g(i,j;l - [i - \Delta_j]). \quad (21)$$

If the binary tread matrix elements can be segmented into units, or domains, that do not significantly interact with each other, then the domains can be treated as units. Such a unit will be called a Macro Tread Matrix Unit, $b_k$.

$$p(l) = \sum_{b_1} g(i,j;l - [i - \Delta_j]) + \sum_{b_2} g(i,j;l - [i - \Delta_j]) + \ldots + \quad (22)$$

$$\sum_{b_k} g(i,j;l - [i - \Delta_j])$$

or $$p(l) = g_1(l) + g_2(l) \ldots + g_k(l) \quad (23)$$

or $$p(l) = \sum_k g_k(l) \quad (24)$$

where $$g_k(l) = \sum_{b_k} g(i,j;l - [i - \Delta_j]) \quad (25)$$

Further if we can use shift-invariance, for example if the carcass of the tire is circumferentially symmetric and it is assumed that there is negligible interaction between ribs then it stands to reason that a rib exhibits shift-invariance. The rib can be simply one domain, or a multiple of non interacting domains, such as portions of a rib or a lug.

In order to exploit this simplification, the engineer must first segment the binary tread matrix into macro tread matrix units $b_k$. These domains may be obtained from experimental data or symmetry principles.

The design of load supporting elements is dictated by concerns for wear, traction, visual appearance, and manufacturing ease; as well as noise generating characteristics. For these reasons, the design options available to the noise engineer may be limited to the positioning of dictated load supporting elements. This invention facilitates the positioning of the load supporting elements.

If macro tread matrix unit $b_k$ is shifted circumferentially by $\Delta_k$, then $$p(l) = \sum_{k} g_k(l + \Delta_k) \qquad (26)$$

Figure 4:
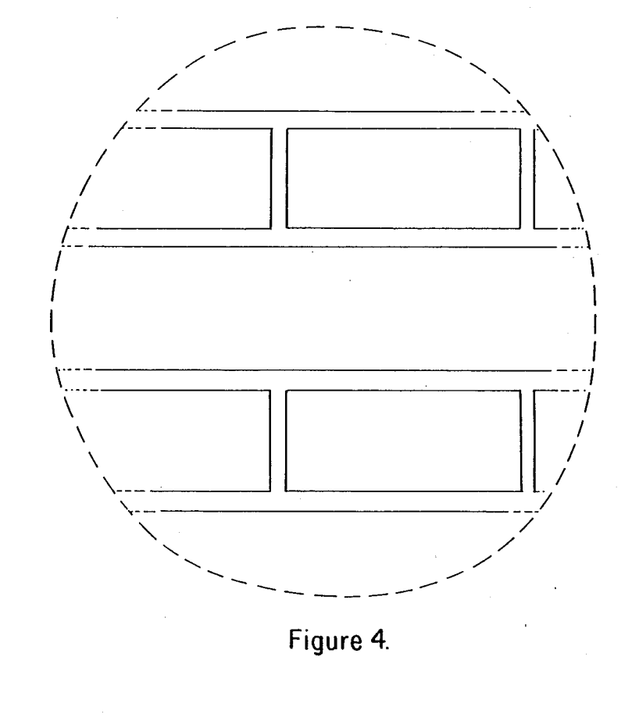
FIG. 4 is an actual footprint of a simplified two rib pattern, each rib consisting of rectangular tread elements of constant pitch, the tread elements of the ribs being in phase.

Referring now to FIG. 4 there is schematically illustrated the footprint, referred to generally by reference numeral 10, of a two rib tire which is tested using this method. A first tire was cut with a solid central rib 11, and on either side are cut, symmetrically about the circumferential plane, two identical ribs 12 and 13, separated by circumferential grooves 14 and 15, respectively. Each rib 12 and 13 are cut with a multiplicity of transverse grooves 16 and 17 respectively, so that the blocks are of equal length and the transverse substantially linear grooves are in alignment. In a specific example, each rib was hand cut with 38 equally spaced rectangular load supporting elements, that is that constant pitch. It is assumed that the ribs do not significantly interact, and therefore the tread can be segmented by ribs into two macro tread matrix units. The footprint shape was obtained and a set of g(i,j; l)'s was generated for rib 12 using the fluid displacement model. The g(i,j; l)'s were summed to yield $g_1(l)$ for rib 12.

Since the footprint in FIG. 4 is also symmetrical about the centerline $$g_2(l) = g_1(l) \qquad (27)$$

and therefore $$p(l) = 2g_1(l). \qquad (28)$$

Using the simulation method described hereinabove, we load the set of p(l)'s into the waveform generator as described hereinbefore, to generate an audio signal.

Figure 5:
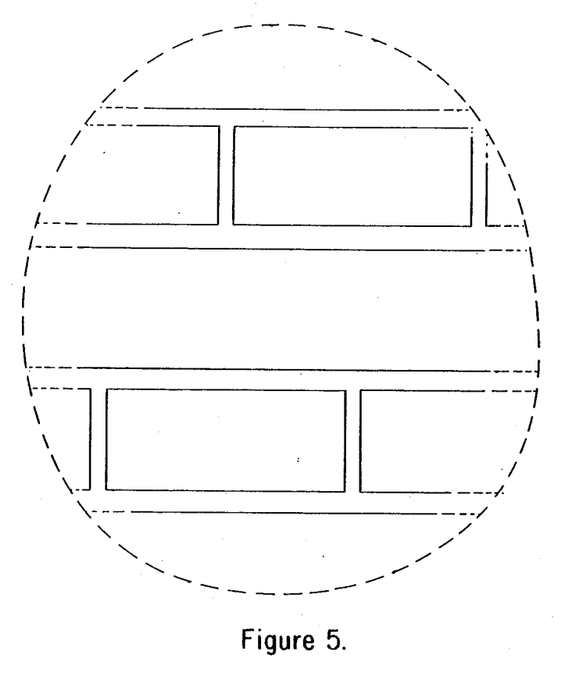
FIG. 5 is an actual footprint of a simplified two rib pattern on another tire, each rib consisting of rectangular tread elements of constant pitch, the tread elements of the ribs being displaced by one half the length of a tread element so that the ribs are out of phase.

Referring now to FIG. 5 there is schematically illustrated the footprint of another tire with similar rib configuration, having a central solid rib 18, and ribs 19 and 20 on either side. The ribs 19 and 20 are each of the same width as the ribs 12 and 13 with the same number of rectangular blocks. However, rib 20 is displaced relative to rib 19 by the distance of one-half block length, so that one rib is said to be circumferentially displaced relative to the other.

Again it is assumed that the ribs do not significantly interact and therefore the tread can be segmented into two macro tread matrix units. Moreover, it is assumed that due to the symmetry of the carcass, the marco tread matrix units are circumferentially shift-invariant. Hence we use equation (26) to calculate $g_2(l)$ from the already available $g_1(l)$.

The second rib 20 is shifted circumferentially by one half block, or $$\Delta_2 = \frac{1}{2} \frac{m}{38} \approx 27 \qquad (29)$$

for m=2048.
Therefore, $$g_2(l) = g_1(l+27), \qquad (30)$$

and $$p(l) = g_1(l) + g_1(l+27). \qquad (31)$$

Using the simulation method described hereinabove, we load the set of p(l)'s into the waveform generator as described hereinbefore, to generate an audio signal.

Figure 6:
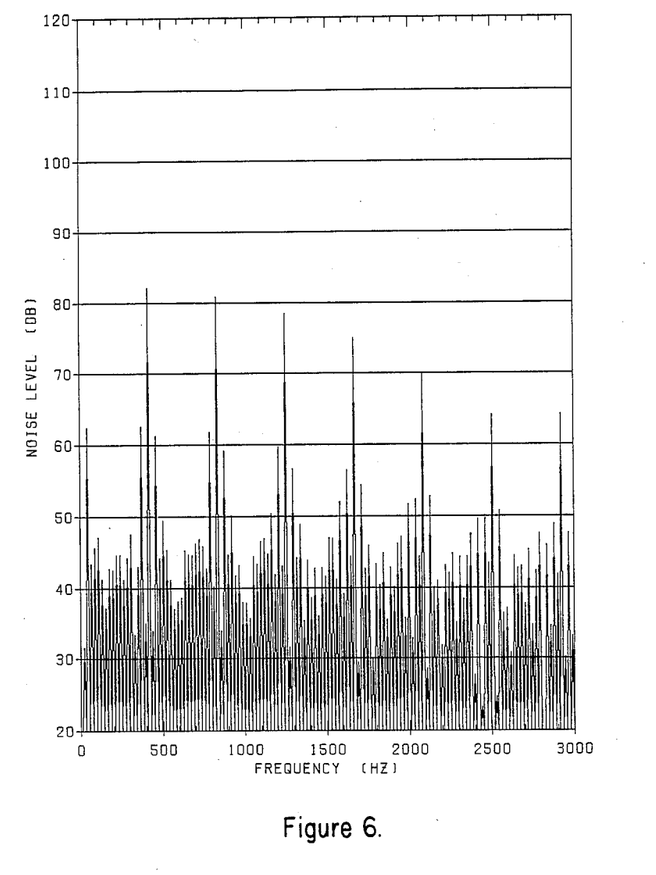
FIG. 6 is a discrete Fourier transform spectrum generated by the set of p(l)'s (see equation (13)) for the in phase constant pitch tread pattern of FIG. 4 for a rotational speed corresponding to 50 miles/hour.

Referring to FIG. 6 there is shown the simulated audio spectrum for the tire tread, the footprint of which is shown in FIG. 4. The noise level is plotted as a function of frequency. The first peak is the fundamental repetition frequency which is seen at about 500 Hz. Major peaks at about 1000, 1500, 2000, etc. correspond to the harmonics of the fundamental.

Figure 7:
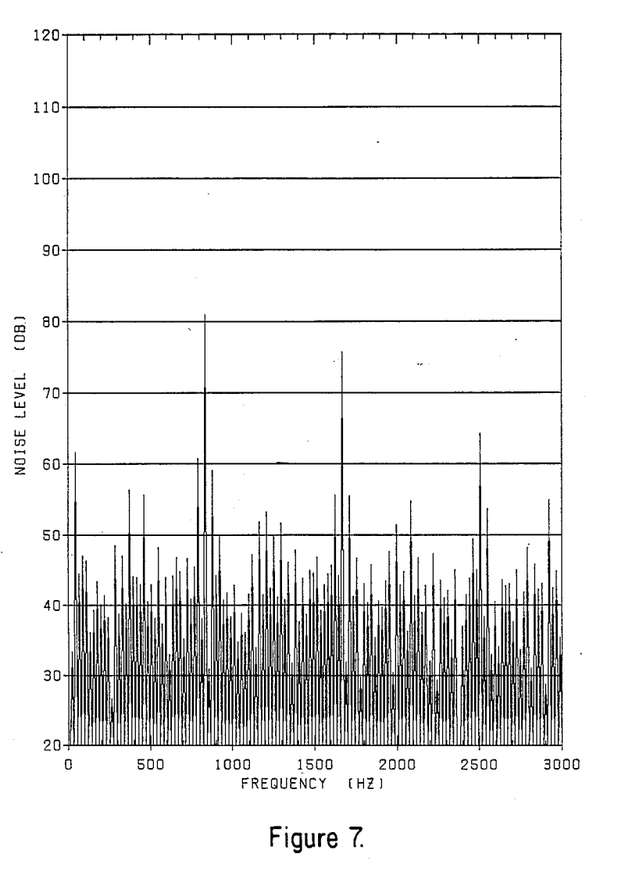
FIG. 7 is a discrete Fourier transform spectrum generated by the set of p(l)'s (see equation (13)) for the out of phase constant pitch tread pattern of FIG. 5 for a rotational speed corresponding to 50 miles/hour.

Referring to FIG. 7 there is shown the simulated audio spectrum for the tire tread, the footprint of which is shown in FIG. 5. The noise level is again plotted as a function of frequency. Now the fundamental and odd harmonic peaks are attenuated. The even harmonics remain essentially the same. This clearly shows that the relative rib rotation has redistributed the noise energy. The foregoing attenuation of the fundamental and odd harmonic frequencies can be readily distinguished in the audio signal generated. The significance of attenuation of the fundamental and odd harmonics is consistent with theory.

Figure 8:
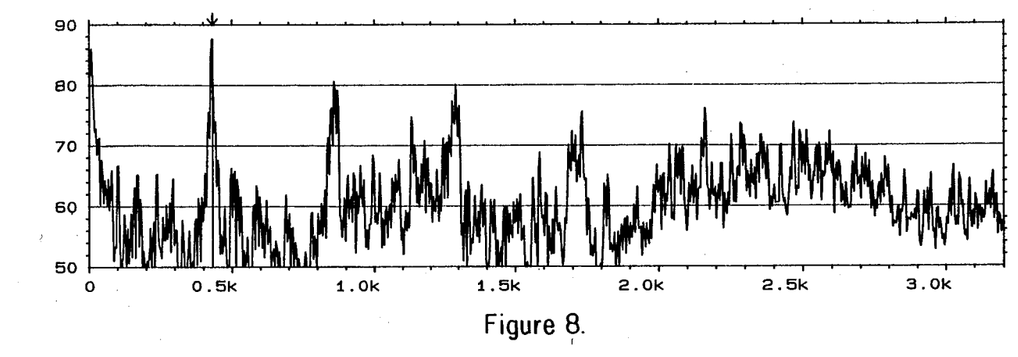
FIG. 8 is the actual spectrum generated by the in phase constant pitch tread pattern of FIG. 4 traveling on a 120 inch roadwheel at a rotational speed corresponding to 50 miles/hour.

FIG. 8 is the measured spectrum of the tire shown in FIG. 4 and it is seen that it is similar in harmonic content to the simulated spectra in FIG. 6.

Figure 9:
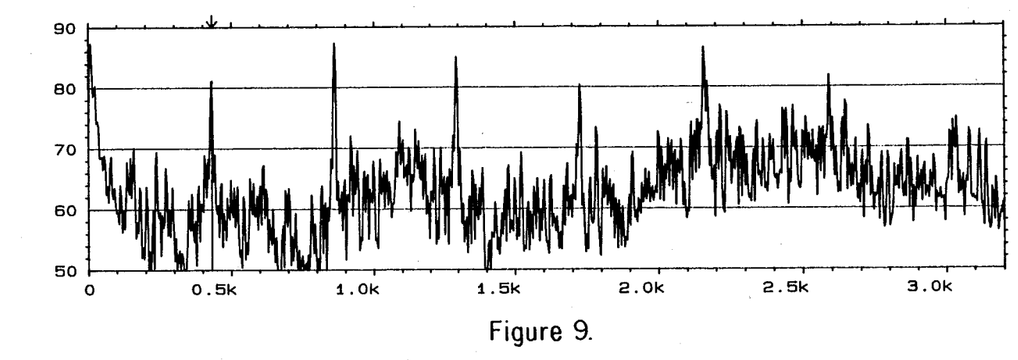
FIG. 9 is the actual spectrum generated by the out of phase constant pitch tread pattern of FIG. 5 traveling on a 120 inch roadwheel at a rotational speed corresponding to 50 miles/hour.

FIG. 9 is the measured spectrum of the tire shown in FIG. 5 and it is seen that it is similar in harmonic content to the simulated spectra in FIG. 7 and it specifically shows that the fundamental has been attenuated. Hence it is clear from this simple case that the method works.

Though the foregoing spectra have been generated for 50 miles/hour, it will be recognized that at speeds other than 50 miles/hour the peaks of frequencies in the spectrum will be shifted.

On a real tire, the tread pattern is made of irregular shaped lugs of various sizes and orientations. While the results of shifting a constant pitch tread is predictable, the results of shifting a real tread would be difficult to predict. It is therefore necessary to experimentally determine the optimum shifts, or set of $\Delta_k$'s, to optimize a design.

Figure 10:
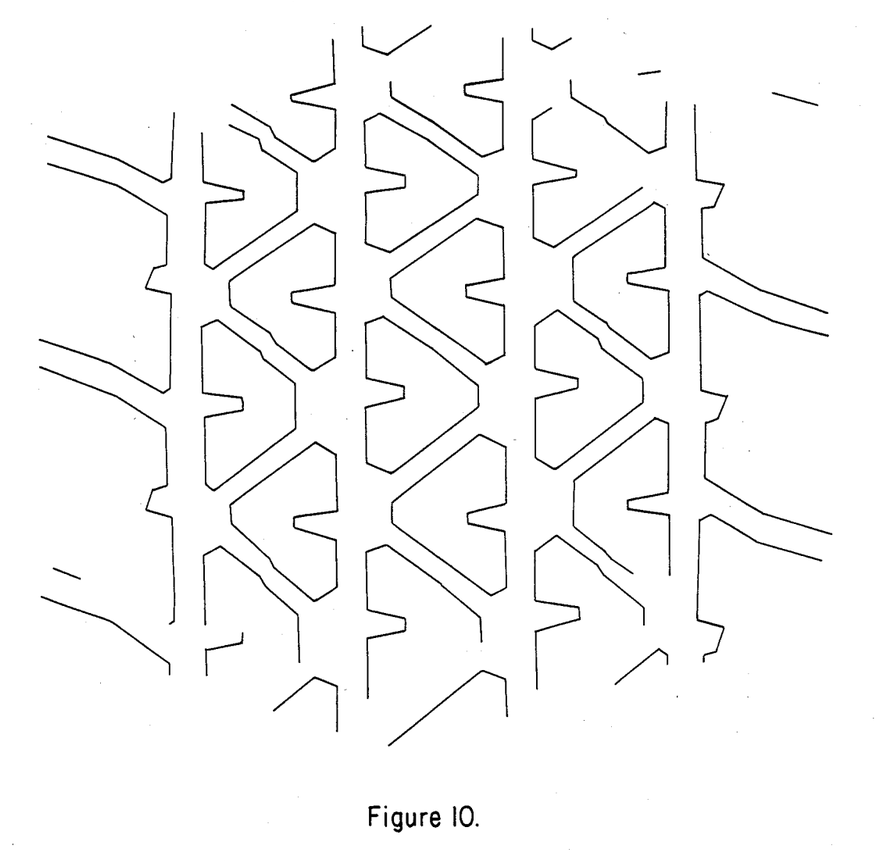
FIG. 10 is an actual footprint of a five rib commercial tire that has not been improved for noise by the method described herein.

Referring now to FIG. 10, there is schematically illustrated the footprint of a five rib tire which was to be optimized using the method. It was assumed that the ribs do not significantly interact, and therefore the tread can be segmented by ribs into three macro tread matrix units $b_1$, $b_2$, and $b_3$. Moreover, it is assumed that due to the symmetry of the carcass, the marco tread matrix units are circumferentially shift-invariant. Therefore, we can use equation (26) to calculate the shifted $g_k(l)$'s. The footprint shape was obtained and a set of g(i,j; l)'s was generated for each macro tread matrix unit using the fluid displacement model. The g(i,j; l)'s were summed for each macro tread matrix unit to yield $g_1(l)$, $g_2(l)$, and $g_3(l)$. p(l) was calculated as $$p(l) = g_1(l) + g_2(l) + g_3(l). \qquad (32)$$

Using the simulation method described hereinabove, we load the set of p(l)'s into the waveform generator as described hereinbefore, to generate an audio signal.

Macro tread matrix units $b_2$ and $b_3$ were shifted by $\Delta_2$ and $\Delta_3$ respectively. p(l) was calculated by $$p(l) = g_1(l) + g_2(l + \Delta_2) + g_3(l + \Delta_3). \qquad (33)$$

Using the simulation method described hereinabove, we load the set of p(l)'s into the waveform generator as described hereinbefore, to generate an audio signal.

$\Delta_2$ and $\Delta_3$ were incremented in units of 0.10 inch, and the process was repeated until the best combination of $\Delta_2$ and $\Delta_3$ was found by subjective evaluations of the simulated signals. The resulting design is shown in FIG. 11.

An alternate method would be to load each $g_k$ into individual arbitrary waveform generators which could be synchronized with variable time delays to sweep through $\Delta_k$'s in real time.

Figure 12:
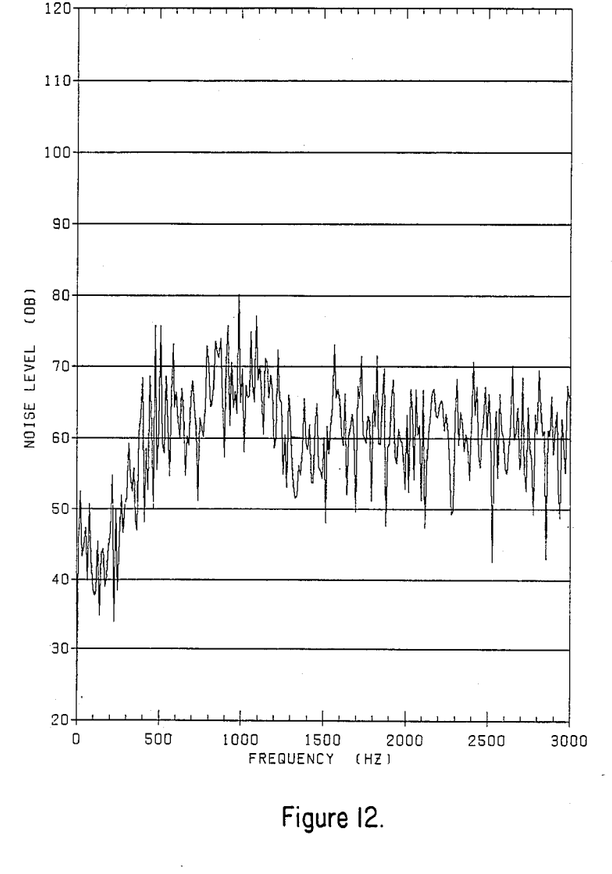
FIG. 12 is a discrete Fourier transform spectrum generated by the set of p(l)'s (see equation (13)) for an initially approved prototype of a five rib tread design variably pitched.

Referring to FIG. 12 there is shown the simulated audio spectrum for the tire thread, the footprint of which is shown in FIG. 10. The noise level is plotted as a function of frequency. This tire has a marginally acceptable noise level which was subjectively rated at 5.0 on a 10.0 scale—10.0 being rated perfectly quiet.

Figure 11:
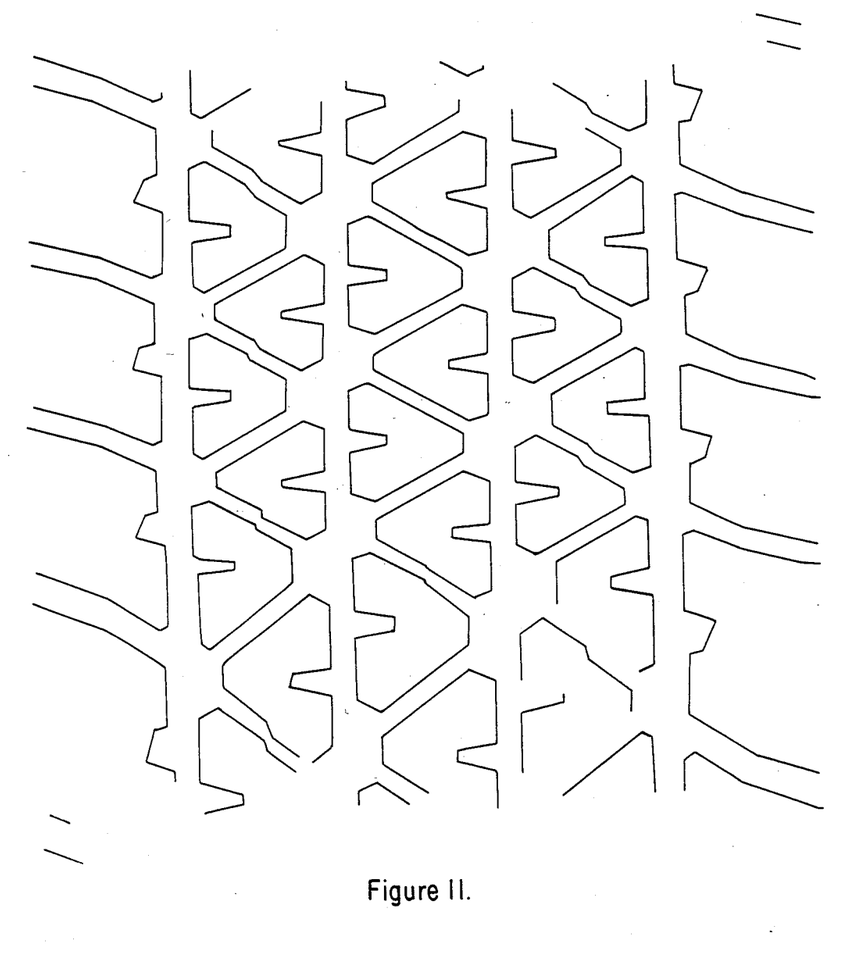
FIG. 11 is an actual footprint of a five rib commercial tire that has been improved for noise by using the method described herein.
Figure 13:
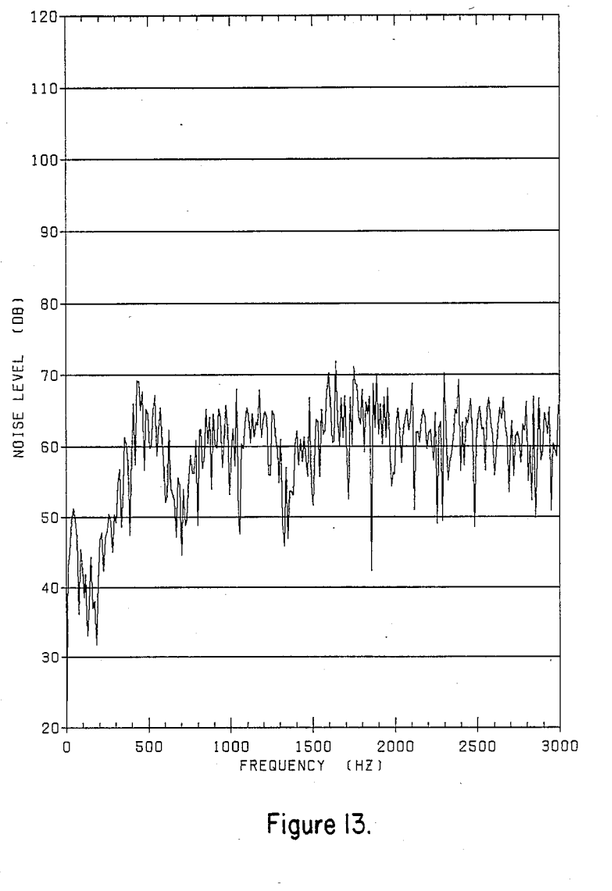
FIG. 13 is a discrete Fourier transform spectrum generated by the set of p(l)'s (see equation (13)) for the same initially approved prototype of a five rib tread design variably pitched, whose intermediate ribs have been shifted relative to their original position.

Referring to FIG. 13 there is shown the simulated audio spectrum for the tire tread, the footprint of which is shown in FIG. 11. The noise level is again plotted as a function of frequency. This tire has a more acceptable noise level which was subjectively rated at 6.5 on a 10.0 scale—10.0 being rated perfectly quiet. This is in agreement with the predictions from the simulation.

It will be seen from the foregoing that the relative movement of plural ribs was done by trial and error. This procedure may be effected by logically reducing the shifts to a programmed statistical analysis whereby the screening of the spectra is completed by machine analysis.

It will also be appreciated that the assumption has been made that relative shifts of the ribs will not affect the profile of the footprint substantially. In the best case the shape of the footprint will not change with the relocation of ribs in the tread pattern. We recognize that this assumption is not accurate. But this problem is not to be solved by relative rib rotation.

What is claimed is:

1. In a method for evaluating the level of objectionable noise associated with the operation of a tire by virtue of its tread contacting a road surface, comprising,
    digitizing the tread design on a coordinate system so as to define load-supporting portions of the tread in contact with the pavement, and distinguish them in binary form from those portions of the tread which are not in contact, as multiple matrix elements;
    defining a generally arcuate profile of a leading or trailing edge of a footprint of the tread by fitting an equation to the edge;
    sequentially performing a time ensemble summation, of the noise produced by each matrix element, over every matrix element on the entire circumferential surface;
    converting the sequence of summation to a periodic analog signal;
    converting the analog signal to a sound; and,
    aurally evaluating the sound,
    the improvement comprising,
    rotating a predetermined rib over a preselected angular displacement relative to another rib.

2. The method of claim 1 wherein said relative rotation of said rib is adjusted to attenuate a preselected set of frequencies.

3. The method of claim 2 wherein said relative rotation of said rib is adjusted to attenuate the fundamental.

4. The method of claim 3 wherein sequentially performing a time ensemble summation includes sequentially summing 0's and 1's along at least one footprint edge for regularly spaced sequential translations of the footprint around the circumference of the tire.

5. The method of claim 2 wherein sequentially performing a time ensemble summation includes correlating the sound generated by individual matrix elements consisting essentially of said load supporting portions and grooves, and using a sampling rate which is at least the Nyquist rate.

* * * * *